(12) United States Patent
Rajamony

(10) Patent No.: US 7,475,129 B2
(45) Date of Patent: Jan. 6, 2009

(54) ESTIMATING BANDWIDTH OF CLIENT-ISP LINK

(75) Inventor: Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 10/734,771

(22) Filed: Dec. 12, 2003

(65) Prior Publication Data

US 2005/0132068 A1    Jun. 16, 2005

(51) Int. Cl.
*G06F 15/16* (2006.01)
*G06F 15/173* (2006.01)

(52) U.S. Cl. .................. 709/223; 709/203; 709/228; 709/244; 709/230

(58) Field of Classification Search ......... 709/223–225, 709/228, 203; 370/230, 252, 310
See application file for complete search history.

(56) References Cited

U.S. PATENT DOCUMENTS 6,731,600 B1 * 5/2004 Patel et al. .................. 370/230
6,965,573 B1 * 11/2005 Mizukoshi .................. 370/252
7,130,268 B2 * 10/2006 Mascolo ...................... 370/232
2001/0010059 A1 * 7/2001 Burman et al. .............. 709/224
2002/0169880 A1 * 11/2002 Loguinov et al. ........... 709/228
2003/0037141 A1 * 2/2003 Milo et al. ................... 709/225
2004/0088349 A1 * 5/2004 Beck et al. .................. 709/203
2005/0071876 A1 * 3/2005 van Beek ..................... 725/62

* cited by examiner

*Primary Examiner*—Jeffrey Pwu
*Assistant Examiner*—Sulaiman Nooristany
(74) *Attorney, Agent, or Firm*—Casimer K. Salys; Dillon & Yudell LLP

(57) ABSTRACT

A method, program, and server for estimating the bandwidth of a network connection between a client and a server includes requesting the server to serve first and second objects back-to-back to the client. The first and second objects are sent to the client. The client determines the time interval between delivery of the first and second objects. The time interval is used, in conjunction with information about the size of the second object, to estimate the bandwidth. The requests for the first and second objects preferably identify the first and second objects with URL's that are unique on the network to prevent the request from being serviced by a file cache. The first and second objects may be transmitted to the client from a content distribution network server that is architecturally close to the client's ISP to improve the reliability of the bandwidth estimation.

6 Claims, 4 Drawing Sheets

ESTIMATING BANDWIDTH OF CLIENT-ISP LINK

BACKGROUND

1. Field of the Present Invention

The present invention is related to the field of data processing networks and more particular to data processing networks in which clients connect to the network through an Internet service provider.

2. History of Related Art

The maximum technically feasible bandwidth between a client and its Internet Service Provider (ISP) is an important measure because it sets a limit on obtainable performance. Those who provide and maintain web sites are interested in this measure for at least two reasons. First, with knowledge of the client's maximum obtainable bandwidth, a Web site can allocate responsibility for poor performance. If a client who appears to be using an ISP connection having adequate bandwidth experiences long delays, the Web site should attempt to address the cause of the delays whereas, if the client's Internet link has limited bandwidth, any delays experienced by that user may be beyond the web site's ability to correct. Second, a web site can customize its behavior to a client's bandwidth capacity if the web site knows what that capacity is. The ability to provide high-bandwidth user's with a greater level of features while preventing low-bandwidth users from having to suffer through interminable delay times is an attractive feature.

Measuring bandwidth is difficult in the context of an open network such as the Internet because many variables affect the amount of time required to deliver documents. In particular, the presence of intervening routers and proxies make it problematic to track the amount of time a document takes to travel any particular destination. Some documents may be delayed at various router points while others are not. Because such delays are non-deterministic, measuring bandwidth by determining how long it takes a document to arrive from a known source is fraught with difficulties. It would be desirable to implement a method and system to obtain a reliable estimate of a client's obtainable bandwidth. It would be further desirable if the implemented solution was able to function in the client's existing environment.

SUMMARY OF THE INVENTION

The objectives identified above are addressed by a method, program, and server for estimating the bandwidth of a network connection between a client and a server that includes requesting the server to serve first and second objects, back-to-back, to the client. The first and second objects are sent to the client. The client determines the time interval between delivery of the first and second objects. The time interval is used, in conjunction with information about the size of the second object, to estimate the bandwidth. The requests for the first and second objects preferably identify the first and second objects with URL's that are unique on the network to prevent the request from being serviced by a proxy cache. The first and second objects may be transmitted to the client from a content distribution network server that is architecturally close to the client's ISP to improve the reliability of the bandwidth estimation. In one embodiment, the second object has a size less than or equal to a minimum transmission unit associated with the network so that the second object is prevented from being fragmented in the network. The software enabling the client to initiate the bandwidth estimation process (by requesting the packet pair) may be provided to the client from the server (or a third party service provider) as a snippet that is preferably executable from within a web browser of the client. In one implementation, the snippet creates a pair of image objects, creates a unique identifier, and associates the images objects with a pair of data objects (packets) on the server using a URL that incorporates the unique identifier. The unique identifier is unique across the entire network and is unique to the particular request. The server may ignore or strip away the unique portion of the URL. In this implementation, all requests for the first and second objects are served by a single pair of objects on the server or on a CDN server. In an embodiment, in which the bandwidth estimation process is delegated to a service provider, the service provider may also monitor the server's response time and alert the server when the response time for a particular client is longer than the client's bandwidth would warrant.

BRIEF DESCRIPTION OF THE DRAWINGS

Other objects and advantages of the invention will become apparent upon reading the following detailed description and upon reference to the accompanying drawings in which.

Figure 1:
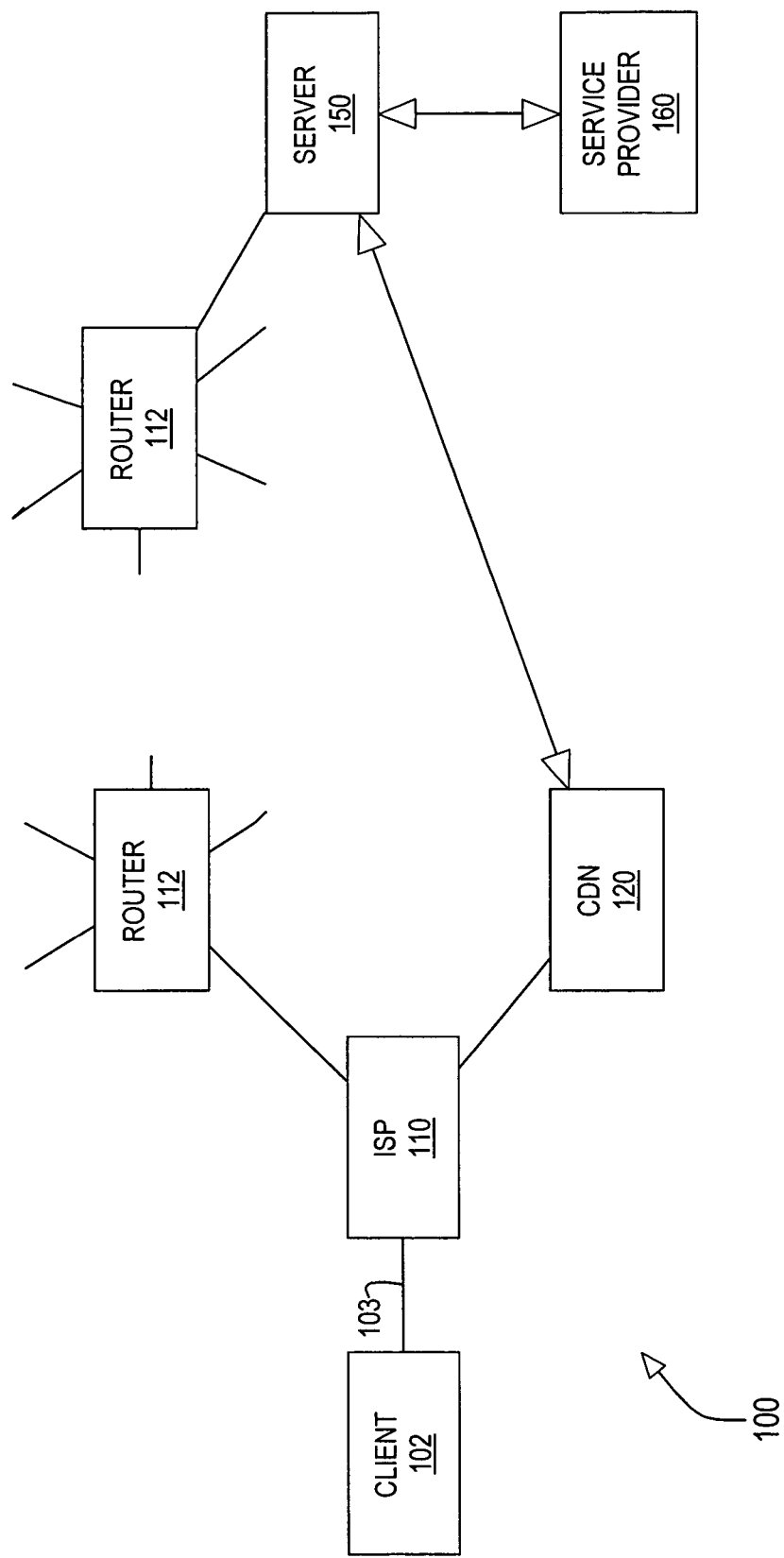
FIG. 1 is a block diagram of a data processing network.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the present invention contemplates a method and system for estimating the obtainable bandwidth over the link between a client and its ISP. When a client accesses a web server, the server or a third party provider (assigned by the server) sends some relatively simple code to the client that is executable within the client's browser. When the code executes, the client generates requests for a pair of packets from the server. The server provides, or has another site provide, these requested packets "back-to-back" or spaced closely apart in time. When the client receives the entire first packet, it records the time. When the client receives the entire second packet, it records the time again. From the difference in the two recorded times and knowledge of the second packet's size, the client-side code can calculate an empirical bandwidth number. Increased accuracy is obtained by repeating the process three or more times and using the highest determined bandwidth.

Referring to FIG. 1, selected elements of a data processing network 100 according to one embodiment of the present invention are depicted. In the depicted embodiment, network 100 includes a client system (client) 102 shown as connected to a wide area network such as the Internet through a link 103 with the client's ISP 110. The present invention is interested in obtaining a reliable estimate of the maximum obtainable bandwidth of client-to-ISP link 103. Because all packets that are transmitted to and from client 102 must traverse link 103, and because the bottleneck bandwidth for the vast majority of clients is the client-ISP link 103, the maximum obtainable bandwidth of link 103 substantially determines the client's ability to send and retrieve data. The client bandwidth for sending and receiving data may not be the same depending upon the implementation (ADSL, for example). For many applications, the parameter of most interest to web site providers and others is the client's maximum obtainable bandwidth for receiving information and it is this parameter that is the primary focus of the present invention. ISP 110 represents a gateway through which all traffic being delivered to and received from client 102 must pass. Typically, ISP 110 permits client 102 to access the Internet in exchange for monthly or annual subscription fee. As a general rule, the amount of the periodic fee varies with the quality or speed of the link. Subscribers who desire or require high speed Internet access typically pay more than subscribers for whom dial up access is adequate. Alternately, the link may be provided for free by a provider (for instance, at a customer retail store) where the bandwidth is limited by what the local server provider can offer. In addition, geographic and other considerations may dictate that an end-user only have a dial-up connection.

Client 102 is a data processing device or system such as a desktop or notebook computer, a wireless device such as a web-enabled cellular telephone or PDA, or any other "network aware" device. Accessing content on the world wide web is achieved with a browser that executes on the client hardware. Almost all browsers in use to any significant extent share some common attributes. One such attribute is the browser's ability to execute JavaScript® code. JavaScript® is a open, platform independent, object oriented computer programming language developed by Netscape Corporation. In the depicted embodiment client 102 contains a fully functional runtime environment that enables a system or device to execute JavaScript® code.

When client 102 wants to retrieve information, such as an organization's home page, the client will use its browser to enter a universal resource locator (URL) for the home page (e.g., www.OrganizationName.com). The client browser generates a request to retrieve the object represented by the URL from the server (or from a proxy server) where the object is stored. As depicted in FIG. 1, a server 150 represents an organization's web site or web presence. An organization's home page, for example, is stored on server 150 or on storage accessible to server 150.

The organization represented by server 150 is likely to have an interest in determining not only who is visiting its web site but also what level of Internet capabilities its visitors have. This information could be used to differentiate the types of service provided to the visitor. It can also inform the server when its web implementation is inadequate. Specifically, if server 150 is aware that a particular client who has a high-bandwidth connection is experiencing significant delays in viewing pages, etc., the web site design and implementation may need revision.

The difficulty in obtaining an accurate measure of a client's actual bandwidth is due in part to the architecture of the Internet. Theoretically, determining a client's bandwidth may be accomplished by initiating a timer just as some data is being delivered from the server to the client and stopping the timer when delivery of the packet is complete. If the amount of data is known, the transmission time can be used to calculate an empirical bandwidth measure. In local area networks, this approach can be realized by having a server send a pair of packets to the client back-to-back (i.e., in a chronologically adjacent sequence). Then when the client receives the first packet, a timer is started. The timer is stopped upon receipt of the second packet and the bandwidth is estimated by dividing the size of the second packet by the elapsed time. In the context of the Internet however, the presence of intervening hardware devices and files caches makes the task significantly more difficult.

As depicted in FIG. 1, for example, any path from client 102 to server 150 traverses multiple routers 112. If server 150 attempted to determine the client's bandwidth by simply sending a pair of packets to the client, the second packet could be delayed at any of the routers 112 while the router serviced some other packet. In addition, many devices on the Internet include file caches. A file cache is a storage facility used to store recently accessed data. If a client requested a particular object, for example, a copy of the object may well be cached in the storage devices on one or more the routers and/or proxy servers between client 102 and server 150. An example of a file cache is represented in FIG. 1 by the content distribution network (CDN) server 120. A CDN is an attempt to reduce access times to and prevent overloading of a single web server by maintaining large cache files on a number of different servers. Ideally, these CDN servers 120 are located in close proximity to the various ISP's 110. In the context of this application, the proximity of two devices refers to the number of network "hops" between the two devices. Assuming CDN servers 120 are in close proximity to the major ISPs 110 and that the CDN servers cache a significant number of frequently accessed objects, it will be apparent that many requests for web objects may be serviced by cached copies of objects that are in close proximity to the requestor's ISP. As described in greater detail below, one embodiment of the present invention beneficially leverages the existence of CDN's 120 to improve the reliability of empirically derived bandwidth numbers. In terms of measuring client-ISP link bandwidth generally however, the presence of file caches complicates matters because one cannot be sure of from where a particular object is being served. In the packet pair example, if the first packet is served from a distant server while the second packet is served from a nearby server, the resulting bandwidth determination is likely to be inaccurate and unreliable.

The present invention confronts the difficulties inherent in implementing a packet pair concept on the Internet from within a browser. Portions of the implemented solution may be in the form of a set or sequence of computer executable instructions stored on a computer readable medium. The instructions may be stored on a persistent storage medium such as a magnetic disk or tape, a read only memory (ROM) device including electrically erasable devices such as flash memory devices, and so forth. At times when the instructions are being executed, the software may reside in a volatile storage medium such as a system memory of a data processing system or a cache memory associated with one of the system's processors.

Figure 2:
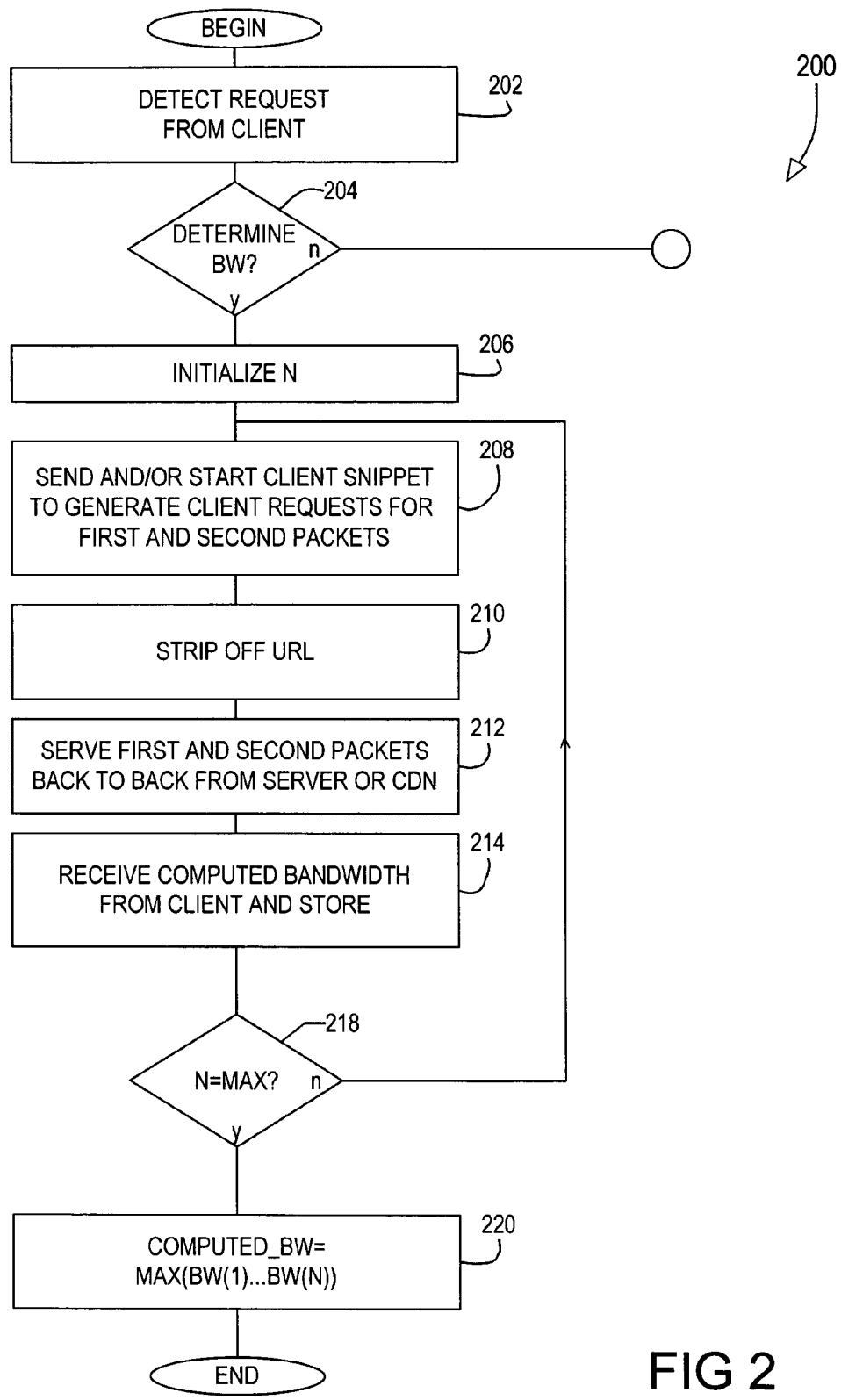
FIG. 2 is a flow diagram of a method of determining a client's obtainable bandwidth according to one embodiment of the invention.

Referring to FIG. 2, a flow diagram illustrates a method 200 of determining the bandwidth of a particular client's link within an Internet environment. In one implementation, much of the code or software required to carry out the invention is JavaScript® code executable within most conventional browsers. In the depicted embodiment, method 200 includes the detection by a server such as server 150 of FIG. 1 of a client request. A typical request received from a client is the well known HTTP-formatted GET request for a particular URL. Upon receiving such a request, the server determines (block 204) whether it wants to estimate the requesting client's bandwidth. The server may choose to have the bandwidth estimated only for selected client's and only at selected times. The server may, for example, choose to cause bandwidth estimation only for clients who visit the server (i.e., request a URL from the server) frequently. A server may also choose to have bandwidth estimated only during times of low activity (when the processing overhead associated with supplying the packets necessary for the bandwidth determination has less of an impact) or during times of high activity (when allocating the server's available bandwidth is important). If the server elects not to have bandwidth estimation be conducted following receipt of a request, the server will simply service the request in a conventional manner.

If the server does initiate the bandwidth estimation, the depicted embodiment of method 200 first initializes (block 206) a variable that tracks or counts the number of bandwidth estimation iterations that have been performed. In preferred embodiments of the invention, multiple bandwidth estimation iterations are undertaken to improve the accuracy of the final result. The number of iterations is likely determined by the server while tracking the number of iterations is likely to be the responsibility of the client side, but alternative implementations may allocate these responsibilities in an alternative manner. Following initialization of the iteration variable, the server (or a third party provider as described below with respect to FIG. 4), sends (block 208) the requesting client a JavaScript® snippet. A JavaScript® snippet is piece of JavaScript® source code designed to perform a specific task. In the present invention, the snippet that is delivered to the client (the client-side snippet) is generally designed to request a pair of packets from the server and perform other bandwidth estimation activities including as example, starting a timer, computing time, computing bandwidth, etc. An implementation of the client-side snippet is described in greater detail below with respect to FIG. 3.

When the server sends the snippet to the client, the client's browser and, more particularly, the JavaScript runtime environment of the client's browser, executes the snippet. In one embodiment, the server may embed into this snippet, the capability to determine whether whether the client-ISP bandwidth should be determined. If the client-ISP bandwidth is to be determined, the snippet causes the client to generate requests for first and second packets from the server. In the described embodiment, both of these packets are identified by predefined URL's that are unique (i.e., to a great degree of certainty, the URL has never been requested before). Unique URL's are desirable in the context of the present invention to insure that the requested object is not found in the cache of an intermediate router or proxy server. The unique URL's according to one embodiment are generated by appending a unique string to predetermined object names. When the server receives the packet requests from the client, the format of the requested URL will inform the server that the URL is being requested for purposes of estimating bandwidth.

While it is desirable to send unique URL's across the network, it is not necessary to have unique packets for each requesting client. Unique objects for each client would require a great deal of storage. The present invention as depicted in FIG. 2 uses unique URL's for purposes of sending a request across the network, but conserves storage on the server side by stripping off (block 210) the unique part of the URL string leaving behind a URL that is common to all clients. The vast (potentially unlimited) set of unique URLs thus map to two pieces of content at the server.

Upon recognizing a request for the first bandwidth estimation packet, the server may then elect to await receipt of the request for the second packet so that the server can be sure that the two packets are delivered back-to-back. In the context of the present invention, back-to-back transmission indicates that the interval between the transmission of the packets of the packet pair is less than the minimum time interval detectable by the client browser. This minimum is today typically on the order of approximately 10 ms, which is ample time in most server applications for insuring that the packets are sent back-to-back.

After receiving the request for the second packet, the first and second packets are served back-to-back (block 212) to the requesting client. The packets may be served by the server 150 itself. In another embodiment that is desirable for reducing the number of hops between the serving device and the client, the server delegates the servicing of the requested packets to a content distribution network. As described above in FIG. 1, a CDN is a network of file cache servers (such as CDN 150) that are intentionally located near (in terms of network hops) ISP's such as ISP 110 of FIG. 1.

The use of a CDN in the context of the present invention beneficially improves the reliability of the estimated bandwidth by reducing the number of network hops that the packets traverse as they are sent to the requesting client. This is especially true when the geographic distance between a particular ISP and a particular server is large (foreign web servers, for example). Many large web servers already use CDN's as a method of reducing access time to requested data and, perhaps more importantly, preventing overload conditions that might otherwise occur when a large number of requests are generated in a short period of time.

In one embodiment, the second packet that is served is constrained to a size that prevents the network from dividing the packet into multiple packets that could skew the bandwidth determination. The size of the second packet, for example, is constrained in one embodiment to be precisely one minimum transmission unit (MTU) minus the size of the various headers. IP headers and TCP headers, for example, together require 40 bytes. The server selects the content size for the second packet so that the content size+HTTP header size+TCP header size+IP header size does not exceed one MTU. As its name implies, an MTU is the largest amount of data that is guaranteed to be sent as a single packet. Any packet larger than an MTU can be fragmented by intermediate routers. In other words, an MTU is the minimum packet that is guaranteed to be transmitted without fragmentation by Internet routers. The MTU on the Internet is 576 bytes. All network hardware must respect the MTU concept meaning that no device on the network is permitted to divide an MTU into multiple smaller packets. In a preferred implementation, the first and second HTTP objects (i.e., the first and second packets) are sent with directives for intermediate caches to not cache the objects. However, some intermediate caches may disobey these directives, caching the objects. As is described with reference to FIG. 3 below, however, such disobeying will not affect the bandwidth estimation process of the present invention.

Following delivery of the packets in block 212, the server then awaits for the client side snippet to calculate the bandwidth based on the elapsed time required to receive the second packet. The calculated bandwidth is then delivered (block 214) to the server and stored.

The iteration variable N, which has been incremented by the client after each iteration, is compared to a predetermined threshold value (block 218). Additional iterations of the procedure are performed until N=MAX. The number of iterations is intended to insure a reliable value while not consuming excessive time and resources. Anecdotal evidence suggests that, in most applications, four iterations of the process are sufficient to estimate a client's maximum obtainable bandwidth with a good degree of accuracy. After performing whatever number of iterations are specified, where each iteration produces a corresponding calculated bandwidth value, the server selects (block 220) the maximum value of the calculated threshold numbers as the value. Alternatively, the client can store each of the estimated bandwidth values, select the maximum value, and transmit that single value to the server. The maximum value is used because it is theoretically impossible for the measured bandwidth to exceed the actual physical bandwidth assuming that packet processing on the client happens in a timely fashion (i.e., assuming that the client side does not delay processing of the first packet for such a long period of time that the estimated transit time of the second packet is artificially low thereby producing an artificially high bandwidth estimate). Under this assumption, the estimated bandwidth cannot exceed the link's physical limitations so that any estimated bandwidth must be less than or equal to the maximum obtainable bandwidth.

Figure 3:
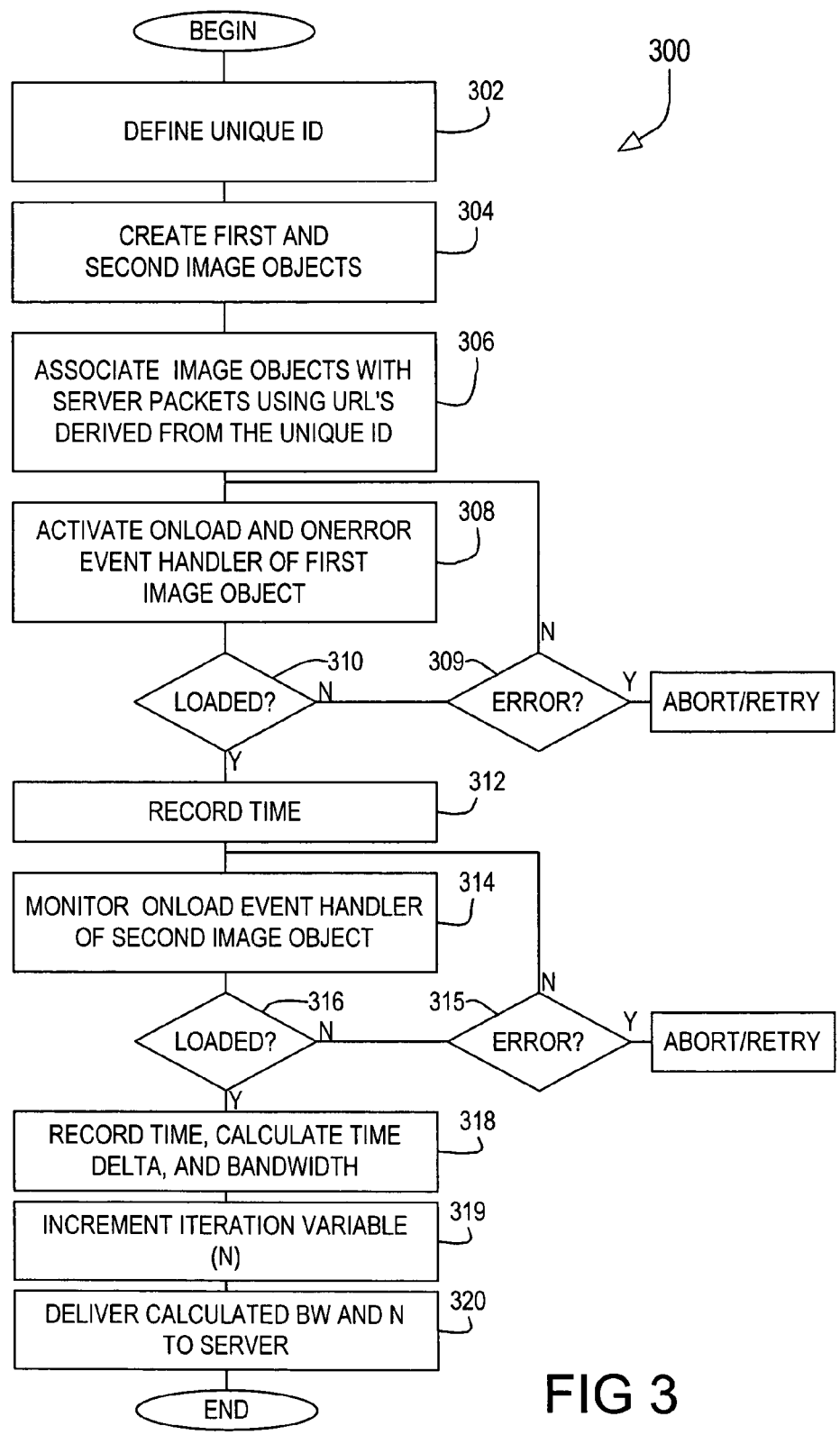
FIG. 3 is a flow diagram illustrating details of the method of FIG. 2 emphasizing processing executed on a client side of the network connection according to one embodiment of the present invention.

Referring now to FIG. 3 a flow diagram illustrates an embodiment of the client side snippet 300 referred to in the preceding discussion of FIG. 2. In the depicted embodiment, the snippet 300 creates a unique ID (block 302). The unique ID may be generated in any manner that assures, with a high degree of certainty, that no other client will generate the same unique ID (thereby rendering the ID not unique). In one embodiment, for example, uniqueness is achieved by concatenating a numeric string derived from a time of day indicator and a random number. As mentioned previously, the unique ID is used as a mechanism to ensure that any caches present on any proxy server or router connected to the ISP are not able to serve either packet in the packet pair.

The client side snippet, after creating the unique ID, creates (block 304) a first and a second object. In the preferred embodiment, the objects that are created are image objects. Image objects are generally used to access graphical images, but in the context of the present invention, image objects are selected because the methods they support are useful in determining the bandwidth determination. Specifically, all JavaScript® image objects support an OnLoad event handler that is invoked when an image object is loaded. This event handler is highly useful in an invention that operates by marking the time when two different packets are fully loaded. Image objects also support an OnError event handler that indicates if an error was encountered during the image load attempt. It should also be noted that JavaScript image objects need not be displayed on the browser screen, and may thus be invisible to the end-user depending upon the implementation.

The first and second image objects that are created are both given a name that includes a "friendly" name for the corresponding image objects (e.g., ImageObjectOne and ImageObjectTwo) to which the unique ID is appended. The use of the same unique ID for both packets in the packet pair beneficially enables the server to determine that two requests came from the same client. In this implementation, the server can wait until both requests with the same ID are received and then send the packets back-to-back.

The image objects are then "pointed" (block 306) to the server or CDN by setting the source (SRC) attribute of the created objects. When the SRC attribute is defined, the objects will initiate retrieval of the named objects from the server side. Before retrieval of the first and second objects, the client snippet activates (block 308) the object's onload and onerror events. When the event loader is eventually triggered (block 310) following receipt of a packet, the time is recorded (block 312). The recorded time represents the point in time from which the bandwidth estimation timing commences. Thus, the reception of the first packet as an image object is a method by which the client can determine when the second packet began to be received at the client.

Figure 4:
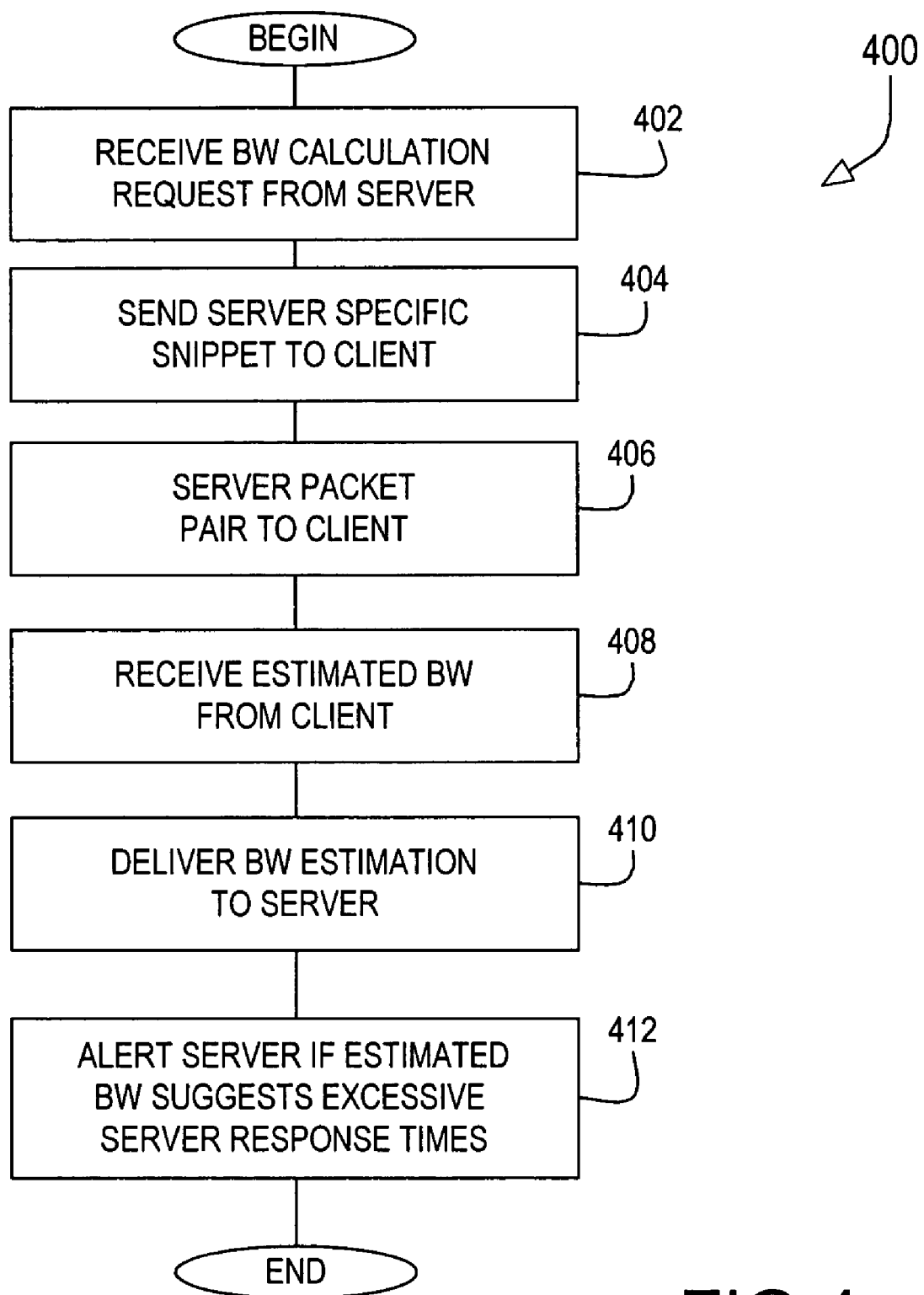
FIG. 4 is a flow diagram illustrating a third party service for enabling a server to determine a client's obtainable bandwidth.

After the first time is recorded in block 312, the snippet monitors (block 314) for the receipt of the entire second image object. When the second image object is fully loaded (block 316), the snippet calculates the elapsed time and, with knowledge of the size of the second packet, determines a calculated value of bandwidth (block 318). In one embodiment, the size of the second object is embedded into the snippet. The iteration variable N is then incremented (block 319) and the calculated bandwidth value is returned (block 320) to the server. This can be achieved in one embodiment by pointing an object to a URL on the server that retrieves the bandwidth value as a parameter. In another embodiment, the client merely informs the server of the time delay between the two packets along with the unique ID used in the determination. The server uses the time delay and the size of the second packet (which it tracks by means of the unique ID) to determine the bandwidth. If either object is not loaded because of an HTTP error (causing the onerror handler to be triggered), the JavaScript snippet can dictate that the client repeat or abort the experiment. The snippet may limit the number of repeats by a client. Finally, the whole bandwidth estimation can be done once per session, or once a period of time expires (for instance, every 4 hours). In typical embodiments, the determination is not done on every page because of the associated overhead. The code snippet provided by the server causes the client to repeat the experiment based on server-dictated conditions. The server may also dictate that only a random set of its entire client-base carry out the bandwidth estimation. Referring now to FIG. 4, a flow diagram of a method of providing the bandwidth estimation functionality to a server is illustrated. In the depicted embodiment, a third party provider, represented by reference numeral 160 is responsible for delivering the snippet code to the appropriate client when invoked by the server. In the depicted embodiment, the server 150 responds to a client request by sending a request to provider 160. Provider 160 receives (block 402) the request and sends the snippet to the client (block 404). In this case, the provider 160 (or CDN 120) serves (block 406) the packets back to the client and receives (block 408) the determined bandwidth from the client (after the appropriate number of iterations). The provider 160 then delivers the bandwidth back to the requesting server. By employing a third party provider, the server is relieved of the requirement of maintaining the client side snippet the server side scripts required to implement the bandwidth determination and can focus instead on the decisions to be made based upon the determined bandwidth. The third-party server can choose to deliver bandwidth information in a continuous basis, or in the form of aggregate reports to the server 160 operator. In addition, provider 160 may be implemented to issue corrective action notices to the server when the estimated bandwidth is inconsistent with one or more other server statistics. As an example, provider 160 may, in addition to tracking client-side bandwidth limitations, track server-side response times. Exemplary methods and systems for monitoring server response times were disclosed in a patent applications entitled Measuring Response Time for a Computer Accessing Information From a Network (application Ser. No. 09/736,348 filed Dec. 14, 2000 and Verification Of Service Level Agreement Contracts (application Ser. No. 09/736,537 filed Dec. 14, 2000, which are incorporated by reference herein.

It will be apparent to those skilled in the art having the benefit of this disclosure that the present invention contemplates a mechanism for empirically deriving a bandwidth determination for a client-ISP link. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for providing a service for estimating the obtainable bandwidth of a client's network connection, said method comprising:
   a service provider receiving, from a server, a request for bandwidth estimation of a bandwidth of a connection between the server and the client;
   the service provider responding to the request for bandwidth estimation by providing the client with a snippet that is an executable configured to request the server to serve first and second objects, in a chronologically sequential manner, to the client via the connection;
   the service provider receiving, from the snippet at the client, information indicative of time elapsed between delivery of the first and second objects; and
   estimating the bandwidth of the connection based in part on the elapsed time;
   wherein the snippet includes:
   instructions for creating first and second image objects;
   instructions for generating a unique identifier (unique ID); and
   instructions for associating the first and second image objects with the first and second
   objects on the server using URLs containing the unique ID.

2. The method of claim 1, further comprising, maintaining response time data for the server and alerting the server based the server response time for a selected client and the estimated bandwidth associated with the selected client.

3. The method of claim 1, wherein the snippet identifies the first and second objects with URLs that are unique on the network connecting the client and the server.

4. The method of claim 3, wherein the server responds to the requests for the first and second objects by transmitting the first and second objects to the client from a content distribution network server that is architecturally proximal to an ISP server to which the client is connected.

5. The method of claim 4, where the second object has a size less than or equal to a minimum transmission unit associated with the network, wherein the second object is prevented from fragmentation.

6. The method of claim 5, further comprising invoking the snippet multiple times to obtain multiple estimates of the bandwidth and selecting the highest bandwidth estimate.

* * * * *